United States Patent
Muramatsu

(10) Patent No.: US 7,436,416 B2
(45) Date of Patent: Oct. 14, 2008

(54) COLOR PRINTER AND CONTROL METHOD THEREOF WITH PULSE WIDTH MODULATION FOR TONE CONTROL BASED ON TYPE OF DOCUMENT AND NUMBER OF COLORS PRINTED

(75) Inventor: Mizuki Muramatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 986 days.

(21) Appl. No.: 10/773,422

(22) Filed: Feb. 9, 2004

(65) Prior Publication Data

US 2004/0160642 A1 Aug. 19, 2004

(30) Foreign Application Priority Data

Feb. 13, 2003 (JP) ............................. 2003-035317

(51) Int. Cl.
*G03G 15/01* (2006.01)
*B41J 2/41* (2006.01)
*H04N 1/29* (2006.01)

(52) U.S. Cl. ...................... 347/115; 347/112; 347/119; 358/300

(58) Field of Classification Search ............... 399/40, 399/58, 60, 66, 67, 121, 122, 138, 260, 3, 399/31, 32, 38, 39, 50, 51, 53, 54, 77, 82, 399/134, 177, 178, 203; 101/365; 347/124, 347/140; 358/1.9, 3.26, 296, 300, 501, 502, 358/518, 521, 530

See application file for complete search history.

(56) References Cited

U.S. PATENT DOCUMENTS

| | | | | | |
|---|---|---|---|---|---|
| 5,252,995 | A | * | 10/1993 | Trask et al. | 347/119 |
| 5,880,751 | A | * | 3/1999 | Nishikori et al. | 347/14 |
| 6,057,866 | A | * | 5/2000 | Haneda et al. | 347/118 |
| 6,950,207 | B1 | * | 9/2005 | Saitoh | 358/1.9 |
| 2002/0118236 | A1 | * | 8/2002 | Uetsuki | 347/7 |
| 2003/0072576 | A1 | * | 4/2003 | Rodriguez | 399/27 |

FOREIGN PATENT DOCUMENTS

| | | |
|---|---|---|
| JP | 06-202472 | 7/1994 |
| JP | 08-156330 | 6/1996 |
| JP | 2001-053978 | 2/2001 |

* cited by examiner

*Primary Examiner*—King Poon
*Assistant Examiner*—Peter L Cheng
(74) *Attorney, Agent, or Firm*—Fitzpatrick, Cella, Harper & Scinto

(57) ABSTRACT

A color printing apparatus having pulse-width modulation means which performs pulse-width modulation for tone control, and a control method thereof are provided. Based on determination of a printing mode of printing data supplied and determination of whether or not the printing data is to be processed as single-color data, a pulse-width modulation pattern to be used by the pulse-width modulation means is decided.

2 Claims, 7 Drawing Sheets

GROWTH PATTERN

COLOR PRINTER AND CONTROL METHOD THEREOF WITH PULSE WIDTH MODULATION FOR TONE CONTROL BASED ON TYPE OF DOCUMENT AND NUMBER OF COLORS PRINTED

FIELD OF THE INVENTION

The present invention relates to a color printer and a control method thereof, and more particularly, to a pulse-width modulation technique employed in a color printer.

BACKGROUND OF THE INVENTION

A data printing apparatus employing an electrophotography method, e.g., a laser beam printer (hereinafter referred to as a "LBP"), is widely used as an output apparatus of a computer. Such data printing apparatus is the factor for rapid expansion of the field of desktop publishing by virtue of its many advantages such as high quality printing results, quietness, and high speed. Additionally, along with the sophistication of a host computer or a controller that serves as a printer's image generation unit, it has become easier to control color images, and color printers adopting an electrophotography method have been developed. As a result, conventional monochrome image printing, as well as color image printing is prevailing.

In a case where a color printer performs rendering, image data, such as a photograph image inputted by an image scanner or a digital camera, or color document data generated by an application program on a host computer, is subjected to color conversion processing using a color conversion parameter so as to match the color output characteristic of the printer. The color conversion parameter is data provided in the form of a matrix or look-up table (LUT).

When a color printer employing the electrophotography method converts RGB data to CMYK data, it is necessary to limit the amount of toner to a certain value due to the problem of fixing-ability and transferability. This limitation is imposed on the data value on which the color conversion has been performed. Particularly, in a case where printing data, such as CAD (computer-assisted design) data that places a great value on thin line reproducing ability, the limitation of the toner amount makes printing of a solid line impossible and may cause deterioration in the thin line reproducing ability. To solve this problem, there are several techniques available, such as an exposure control for actually performing the printing based on CMYK data, a control technique called PWM (pulse-width modulation), which adjusts the laser-driving pulse width in accordance with a data input value, can be used to ensure thin line reproducing ability while limiting the toner amount to a certain value. Pursuant to this technique, secondary colors such as red, green, or blue can be expressed with solid lines.

As described above, for data such as CAD data, which places a great value on thin line reproducing ability, the toner adhesion amount can be controlled by performing laser exposure control, i.e., PWM. However, in a case where the printing data is monochrome data, it is not necessary to perform multicolor printing, unlike full-color data, but it is ultimately the problem of fixability and transferability that is encountered, and is unrelated to the toner adhesion amount. If the aforementioned PWM processing is performed, the amount of the laser beam is reduced, causing declines in the overall density, and in some cases, the thin line reproducing ability deteriorates, causing problems.

SUMMARY OF THE INVENTION

The present invention has been proposed to solve the above problems, and further to improve the thin line reproducing ability of single-color printing in a color printer.

According to one aspect of the present invention, a color printer having a pulse-width modulation means, which performs pulse-width modulation for a tone control and a control method of the printer, are provided. A printing mode of printing data supplied, and whether or not the printing data is to be processed as single-color data is determined. Based on the determination results, a pulse-width modulation pattern to be used by the pulse-width modulation means is decided.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of this specification, illustrate embodiments of the invention and, together with the descriptions, serve to explain the principles of the invention.

DETAILED DESCRIPTION OF THE PREFERRED EMBODIMENT

A preferred embodiment of the present invention will now be described in detail in accordance with the accompanying drawings.

Although the following description explains an embodiment where the present invention is applied to a color LBP having 600 dpi, the present invention is not limited to this, but is applicable to an image forming apparatus, such as a color printer or color facsimile, having an arbitrary printing density.

Figure 1:
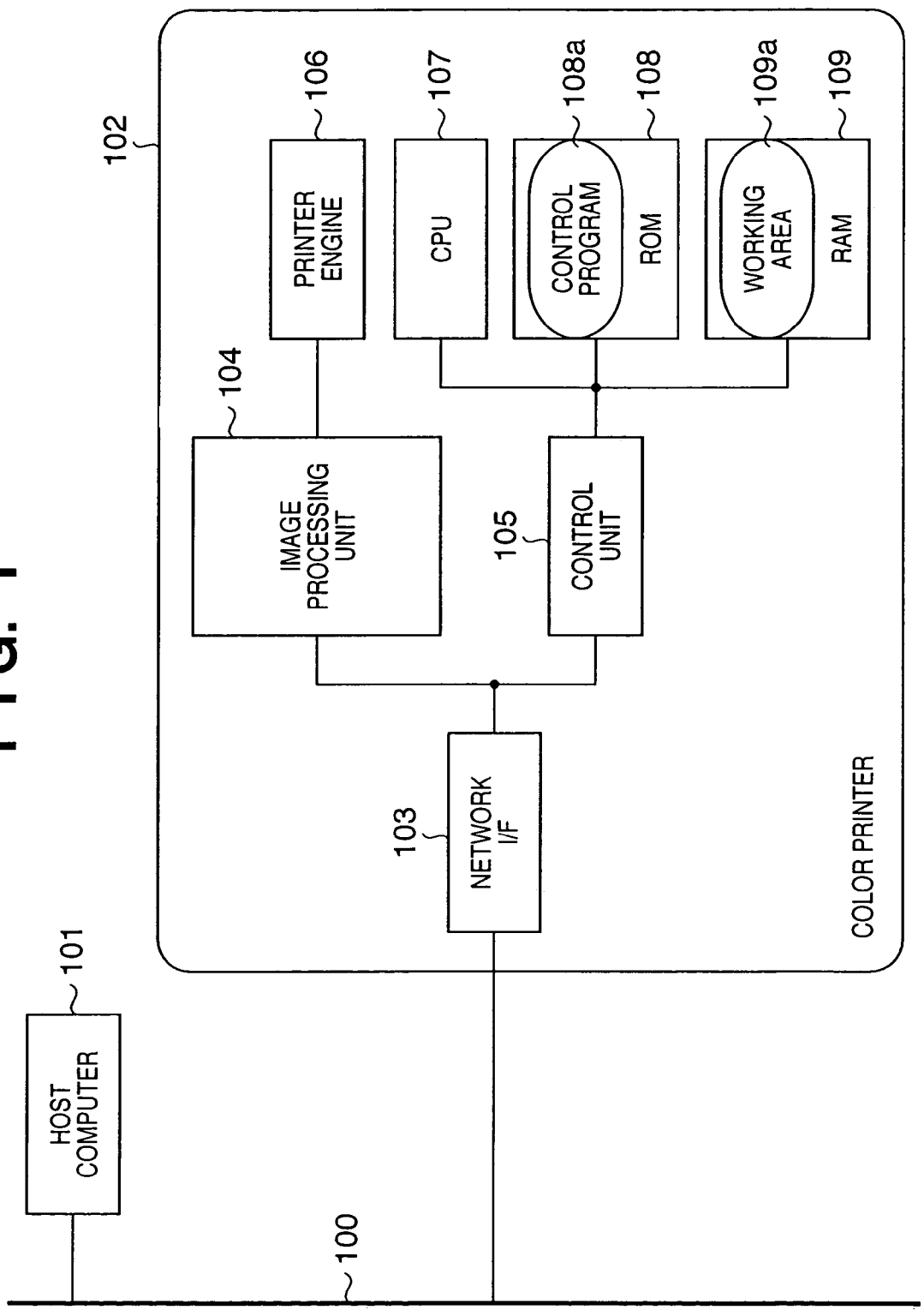
FIG. 1 is a diagram showing an overall view of an image processing system, including a color LBP, to which the present invention is applied.

FIG. 1 is a diagram showing an overall view of an image processing system including a color LBP, to which the present invention is applied.

Referring to FIG. 1, the image processing system of this embodiment is configured with a host computer 101 and a color LBP 102 connected via a network 100. More specifically, numeral 100 denotes a network whose interface specification called Ethernet (registered trademark) is generally known. With the use of a physical cable, such as 10Base-T, and a protocol, such as TCP/IP, data transmission/reception and data transfer can be performed between the connected units.

The host computer 101 outputs printing data necessary for printing processing, such as color data, texts, graphics, images, number of copies, et cetera, to the color LBP 102. The color LBP 102 has mutually similar functions.

Next, a configuration of the color LBP 102 according to this embodiment is described. The color LBP 102 comprises an image processing unit 104 and a control unit 105, which are connected to each other via a bus (not shown), and connected to the network 100 through a network interface 103 (hereinafter referred to as the "network I/F"). The image processing unit 104 is connected to a printer engine 106 which performs actual image forming based on an outputted image signal. The control unit 105 controls an operation of the entire system. This is realized by a CPU 107 transmitting a control signal for performing determination and control of various processes to the control unit 105 in accordance with a control program 108a stored in ROM 108. RAM 109 is used as a working area 109a for the CPU 107 to store data for performing respective controlling.

Figure 2:
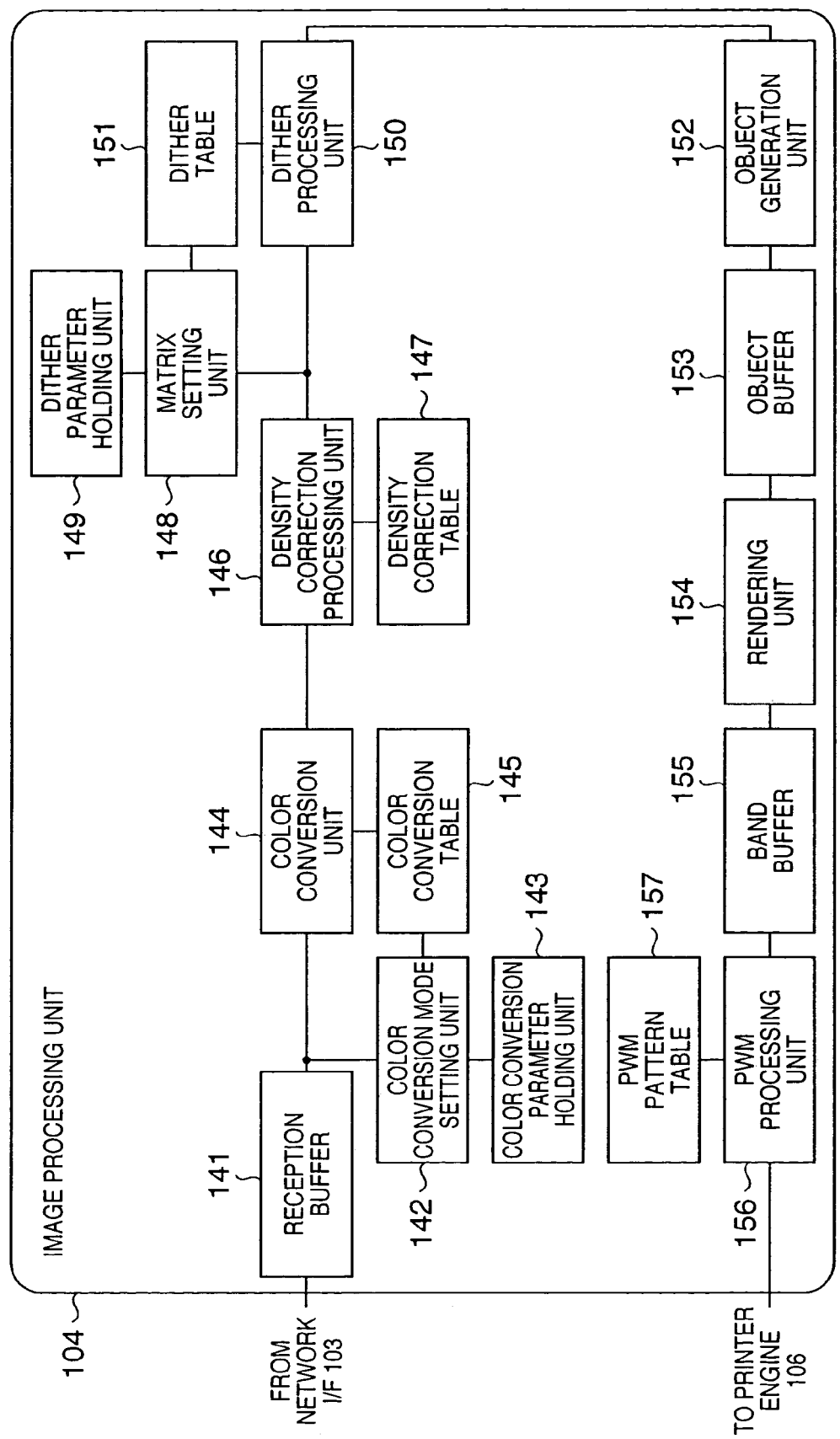
FIG. 2 is a block diagram showing an example of a detailed configuration of an image processing unit in the color LBP according to an embodiment of the present invention.

FIG. 2 is a block diagram showing an example of a detailed configuration of the image processing unit 104 in the color LBP 102. An operation of the image processing unit 104 is explained with reference to FIG. 2.

In FIG. 2, numeral 141 denotes a reception buffer which holds inputted printing data. Numeral 142 denotes a color conversion mode setting unit which selects from a color conversion parameter holding unit 143 a color conversion parameter corresponding to the color conversion mode inputted from the host computer 101, for example, standard color, high-gloss color, low-gloss color, high-saturation color, et cetera, and generates a color conversion table 145 to be stored. Numeral 143 denotes a color conversion parameter holding unit which holds plural color conversion parameters corresponding to the aforementioned color conversion modes. Numeral 144 denotes a color conversion unit which converts printing data having RGB form inputted from the host computer to printing data having CMYK form by performing interpolation with reference to the color conversion table 145.

Numeral 146 denotes a density correction processing unit which performs correction using a density correction table 147 on the printing data having CMYK form, which has been converted by the color conversion unit 144, so that linearity of the density characteristic is preserved. Numeral 148 denotes a dither matrix setting unit which selects from a dither parameter holding unit 149 a dither parameter corresponding to the dither mode inputted from the host computer 101, such as a 4-bit dither, a 2-bit dither, a 1-bit dither, et cetera, and generates a dither table 151 to be stored. Numeral 151 denotes a dither parameter holding unit which holds plural dither parameters corresponding to the aforementioned dither modes. Numeral 150 denotes a dither processing unit which converts printing data having CMYK form, which has been corrected by the density correction processing unit 146, to printing data having the number of tones corresponding to the dither mode by performing comparison operations with reference to the dither table 151.

Numeral 152 denotes an object generation unit which converts data (page description language), such as image data inputted from the host computer 101, to an object. In this stage, the image data is converted to an object having CMYK form converted by the color conversion unit 144, density correction processing unit 146, and the dither processing unit 150. Numeral 153 denotes an object buffer which stores one page of objects converted by the object generation unit 152. Numeral 154 denotes a rendering unit which performs rendering based on the one page of objects stored in the object buffer 153 for converting the objects to bitmap data subjected to rendering. Numeral 155 denotes a band buffer which stores bitmap data generated by the rendering unit 154 and outputs data to a PWM processing unit 156. Numeral 156 denotes a PWM processing unit which performs modulation of a pulse width, corresponding to the laser irradiation time, on the bitmap data generated by the rendering unit 154 based on a pulse-width modulation pattern (also called a PWM growth pattern) set in the PWM pattern table 157, and outputs the modulated data to the printer engine 106. Details of the PWM processing unit 156 will be described later.

Figure 3:
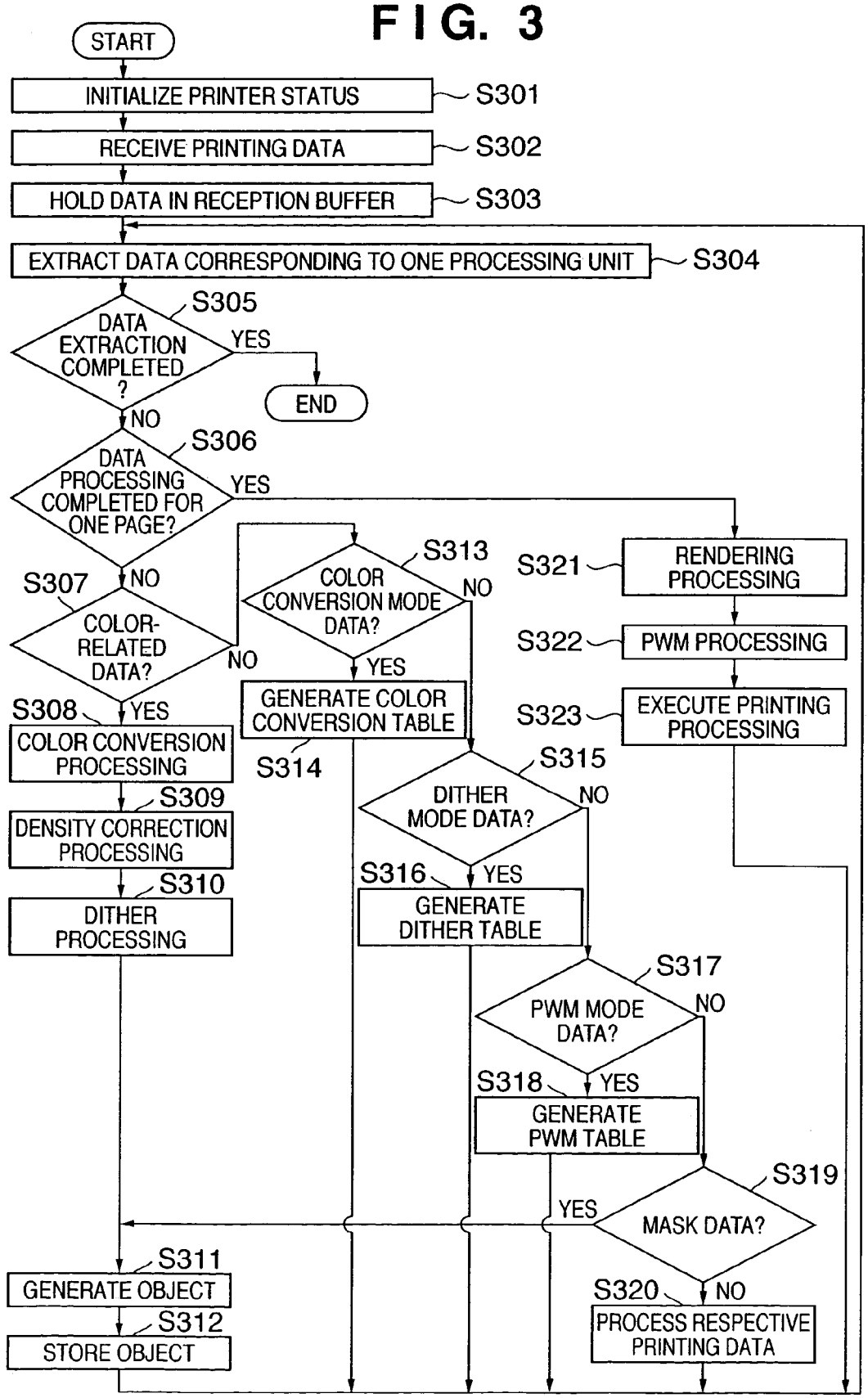
FIG. 3 is a flowchart showing an operation of the image processing unit in the color LBP according to the embodiment of the present invention.

Next, an operation of the image processing unit 104 in the color LBP 102 according to this embodiment is described in detail with reference to the flowchart in FIG. 3. Note that the control program that realizes the process shown in the flowchart in FIG. 3 is stored in the ROM 108 as mentioned above, and is executed by the CPU 107.

First, as the initialization processing of the color LBP 102, the printer status and buffer are initialized (step S301). Next, printing data is received from the host computer 101 (step S302) and held by the reception buffer 141 (step S303). Data corresponding to one processing unit is extracted from the reception buffer 141 (step S304), and then is determined whether or not all data has been extracted (step S305).

If NO in step S305, it is determined whether or not data processing has been completed for one page (step S306). If NO in step S306, it is determined whether or not the printing data is color-related data, such as color data, color image, et cetera (step S307). If YES in step S307, the color conversion unit 144 converts the RGB color data to CMYK color data by performing interpolation with reference to the color conversion table 145 (step S308). The density level is then corrected by the density correction processing unit 146 using the density correction table 147 (step S309). Next, a comparison operation is performed by the dither processing unit 150 with reference to the dither table 151 to convert the CMYK data to dither-processed color data (step S310). An object is generated by the object generation unit 152 (step S311), the generated object is stored in the object buffer 153 (step S312), and the control returns to step S304.

If it is determined in step S307 that the printing data is not color-related data, then it is determined whether or not the printing data is color conversion mode data (step S313). If YES in step S313, the color conversion table 145 is generated using a color conversion parameter corresponding to the color conversion mode by the color conversion mode setting unit 142 (step S314). The control then returns to step S304.

If it is determined in step S313 that the printing data is not color conversion mode data, then it is determined whether or not the printing data is dither mode data (step S315). If YES in step S315, the dither table 151 is generated using a dither parameter corresponding to the dither mode by the matrix setting unit 148 (step S316). The control then returns to step S304.

If it is determined in step S315 that the printing data is not dither mode data, then it is determined whether or not the printing data is PWM mode data (step S317). If YES in step S317, a PWM pattern set by the PWM processing unit 156 is set in the PWM pattern table 157 (step S318). The control then returns to step S304.

If it is determined in step S317 that the printing data is not PWM mode data, then it is determined whether or not the printing data is mask data such as texts, graphics and so forth (step S319). If YES in step S319, an object of the mask data is generated (step S311), the generated object is stored in the object buffer 153 (step S312), and the control returns to step S304.

If it is determined in step S319 that the printing data is not mask data, printing data processing is performed in accordance with the type of data (step S320), and the control returns to step S304.

If it is determined in step S306 that data processing has been completed for one page, rendering processing is performed by the rendering unit 154 based on the object stored in the object buffer 153 (step S321). The bitmap image is then subjected to pulse-width modulation by the PWM processing unit 156 (step S322), and the modulated data is transmitted to the printer engine 106 for executing printing processing on a sheet of paper (step S323).

If it is determined in step S305 that all data has been extracted, the printing process ends.

Next, the PWM pattern table 157 setting process performed by the PWM processing unit 156 in the above-described step S318 is described in detail.

Figure 6:
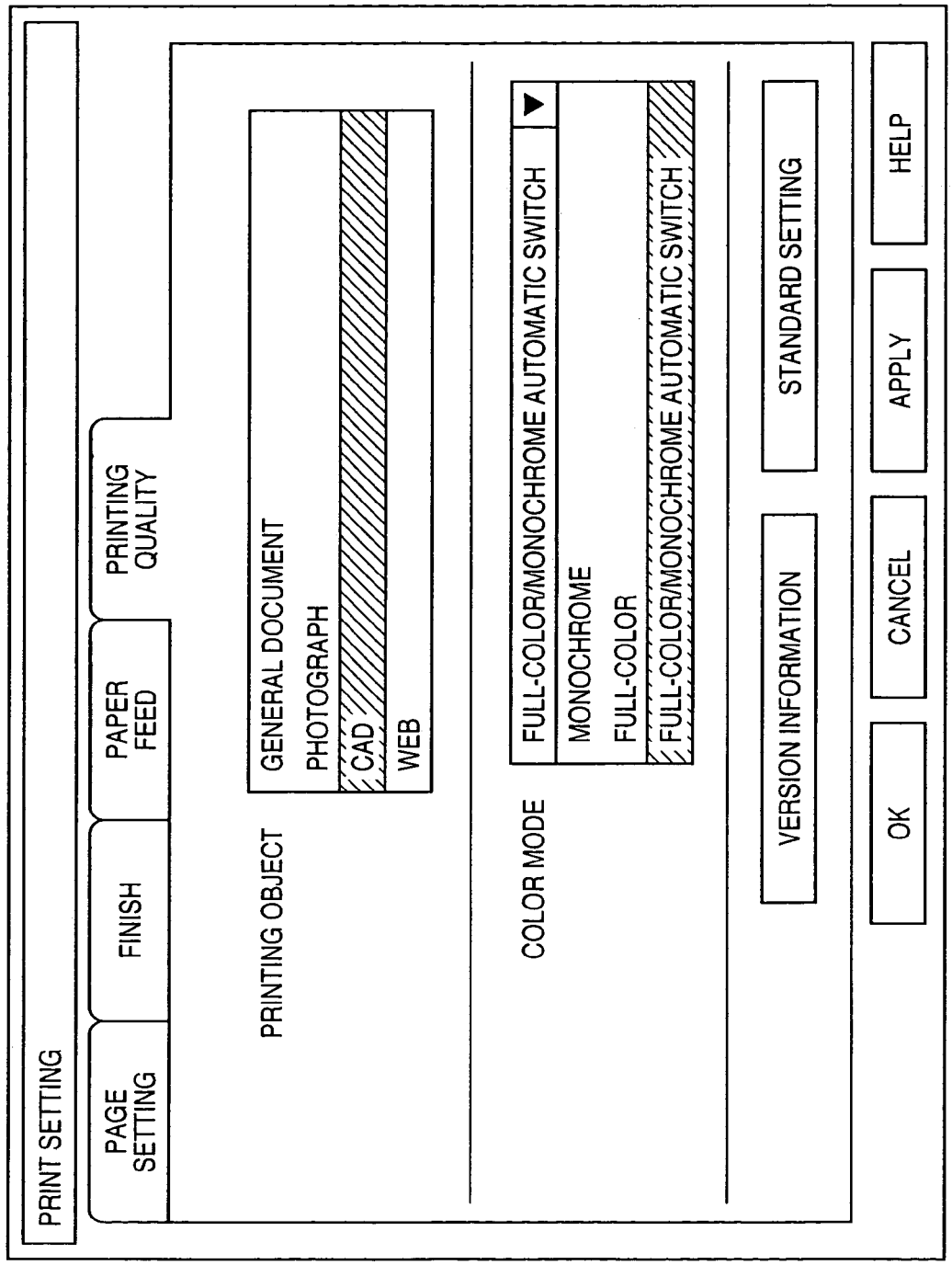
FIG. 6 shows an example of a print-setting screen according to the embodiment of the present invention.

Setting of the PWM pattern table 157 is performed based on the contents set through the print-setting user interface shown in FIG. 6 (normally included in a printer driver program installed in the host computer), which is provided by the host computer 101. According to the example of print-setting screen shown in FIG. 6, a user can select a printing object (printing mode) from among "general document," "photograph," "CAD," and the like. Also, a user can select a color mode from among "monochrome," "full-color," and "full-color/monochrome automatic switch."

The PWM processing unit 156 sets the PWM pattern table 157 based on the aforementioned setting result. Hereinafter, an example of the PWM pattern set in the PWM pattern table 157 is described.

Figure 5:
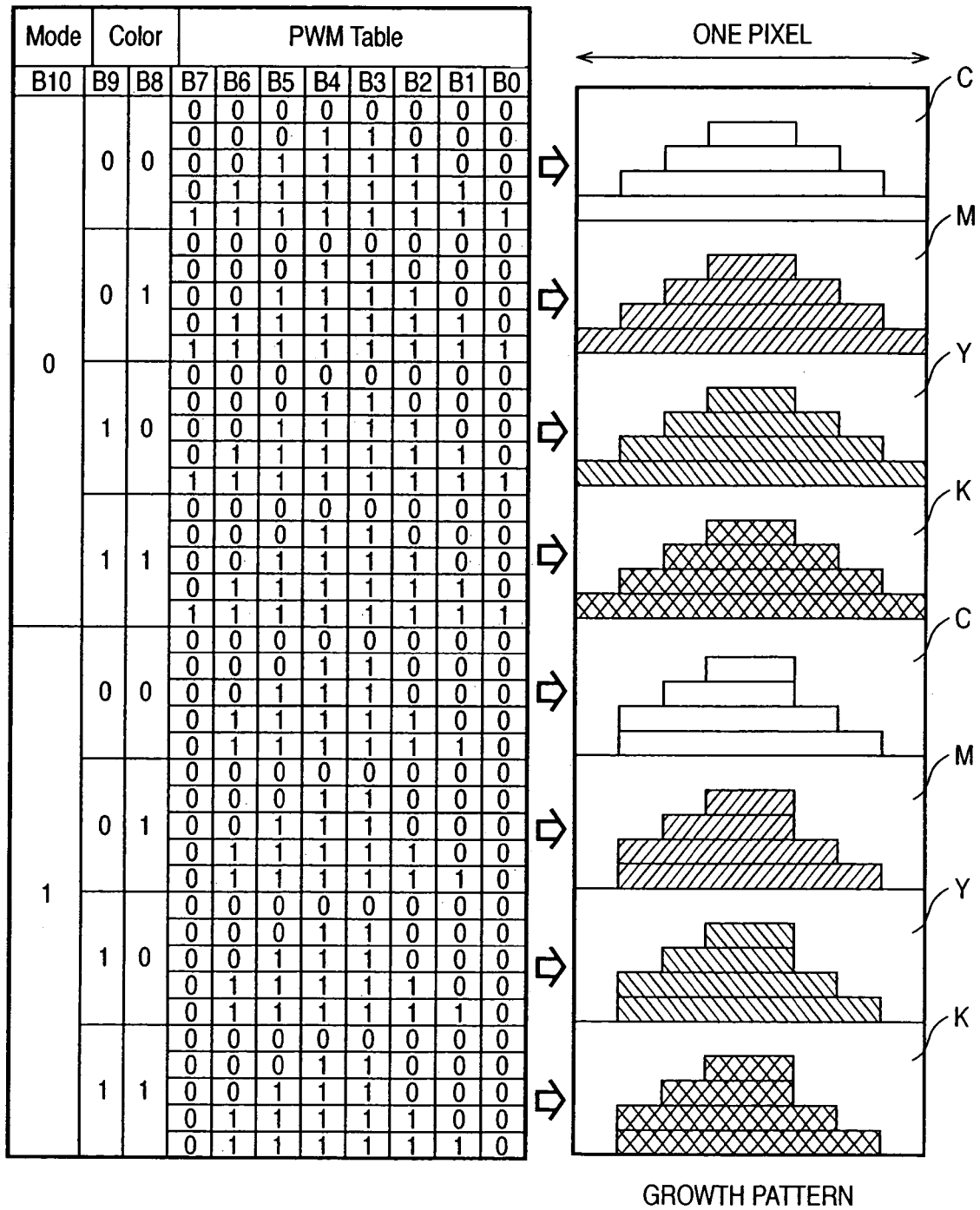
FIG. 5 shows an example of a PWM table which is set in the PWM pattern table according to the embodiment of the present invention.

FIG. 5 shows an example of a PWM table which is set in the PWM pattern table 157. Each pattern is configured with 11-bit length data, wherein one pixel is divided into 8, each of which is capable of expressing 5 tones. In that table, B10 indicates a PWM mode setting flag (Mode), B9 and B8 indicate a color signal flag (Color), and B7 to B0 indicate PWM pattern data (PWM Table).

The PWM mode setting flag in B10 is designated in the setting process of the PWM pattern table 157, which will be described later. The color signal flag designated by the pair of B9 and B8 indicates 00 for cyan (C), 01 for magenta (M), 10 for yellow (Y), and 11 for black (K). The pattern on the right diagrammatically shows the PWM patterns (PWM growth pattern) of the respective colors. Comparing the upper four patterns with the lower four patterns of the PWM growth patterns, the lower four patterns have a narrower pulsewidth, which will contribute to suppression of the adhesion amount of toner that serves as a developer.

In the setting process of the PWM pattern table 157, which will be described below, either the upper four patterns in which the PWM mode setting flag (Mode) is 0 or the lower four patterns in which the PWM mode setting flag (Mode) is 1 is set in the PWM pattern table 157.

Figure 4:
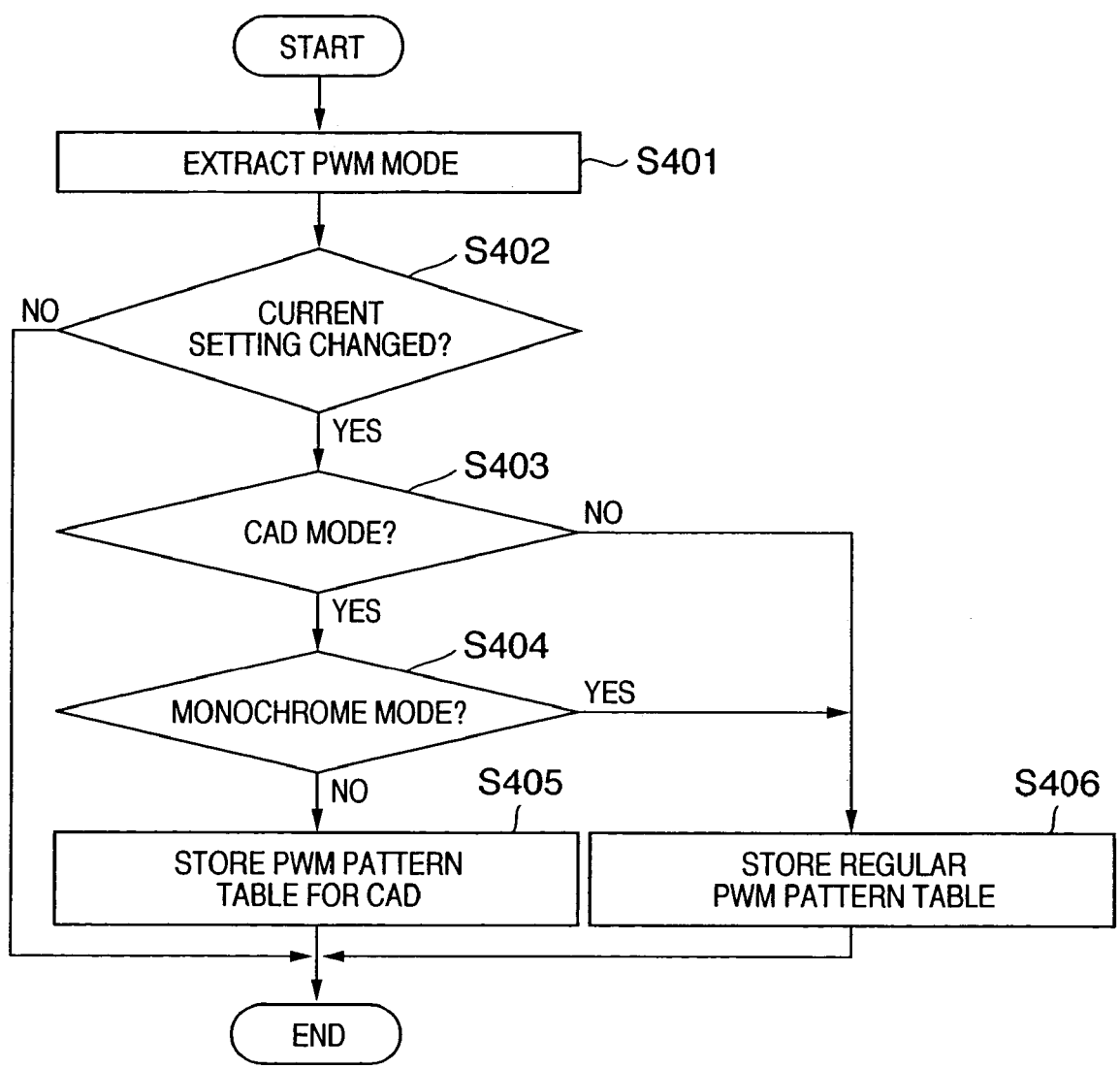
FIG. 4 is a flowchart showing a PWM pattern table setting procedure according to the embodiment of the present invention.

FIG. 4 is a flowchart showing a PWM pattern table 157 setting procedure according to this embodiment.

First, a PWM mode is acquired (step S401). The PWM mode includes, for instance, a CAD data printing mode for printing CAD data and a regular printing mode for printing data other than CAD data. In a case where "CAD" is selected as a printing object (printing mode) in the print-setting screen shown in FIG. 6, the CAD data printing mode is acquired; otherwise the regular printing mode is acquired.

Next, the acquired mode is compared with the currently set PWM mode to determine whether or not the mode has been changed (step S402). If YES in step S402, it is determined whether or not the changed mode is a CAD data printing mode (step S403). If YES in step S403, it is determined whether or not the color mode is set in a monochrome mode (step S404).

If it is determined in step S404 that the color mode is not set in a monochrome mode, the PWM pattern table (PWM pattern table for CAD) where B10 (see FIG. 5) representing the PWM mode setting flag (Mode) is 1 is set in the PWM pattern table 157 (step S405), and the control ends. On the other hand, if it is determined in step S404 that the color mode is set in a monochrome mode, the PWM pattern table (regular PWM pattern table) where B10 representing the PWM mode setting flag (Mode) is 0 is set in the PWM pattern table 157 (step S406), and the control ends.

Meanwhile, if it is determined in step S403 that the changed mode is not a CAD data printing mode, the PWM pattern table (regular PWM pattern table) where B10 representing the PWM mode setting flag (Mode) is 0 is set in the PWM pattern table 157 (step S406), and the control ends.

If it is determined in step S402 that the PWM mode has not changed, the PWM pattern table alteration is not performed and the control ends.

As described above, according to the PWM pattern table 157 setting procedure of the present embodiment, not only the PWM pattern is controlled based on whether or not the set mode is a CAD data printing mode, but also the PWM pattern table to be used by the PWM processing unit 156 is controlled based on whether or not the set mode is a CAD data printing mode or whether or not the printing data is color data. More specifically, when the CAD data printing mode and full-color mode are designated, the PWM pattern for CAD is set in the PWM pattern table 157. Therefore, when the CAD data printing mode and monochrome mode are set, the regular PWM pattern table is applied. By virtue of this control, it is possible to prevent the aforementioned problem of deteriorated thin line reproducing ability, which is caused by a declined density as a result of the reduced amount of laser beams.

Next, a laser beam emission amount control operation executed by the PWM processing unit 156 in the color LBP 102 is described with reference to FIG. 7. The PWM processing according to this embodiment is realized by digitally controlling the laser beam emission amount in accordance with the respective patterns using the PWM pattern table that has been set as described above. More specifically, the laser beam emission time is altered in units of sub-pixel in accordance with the set PWM pattern table, thereby controlling the laser beam amount, and ultimately controlling tones.

Figure 7:
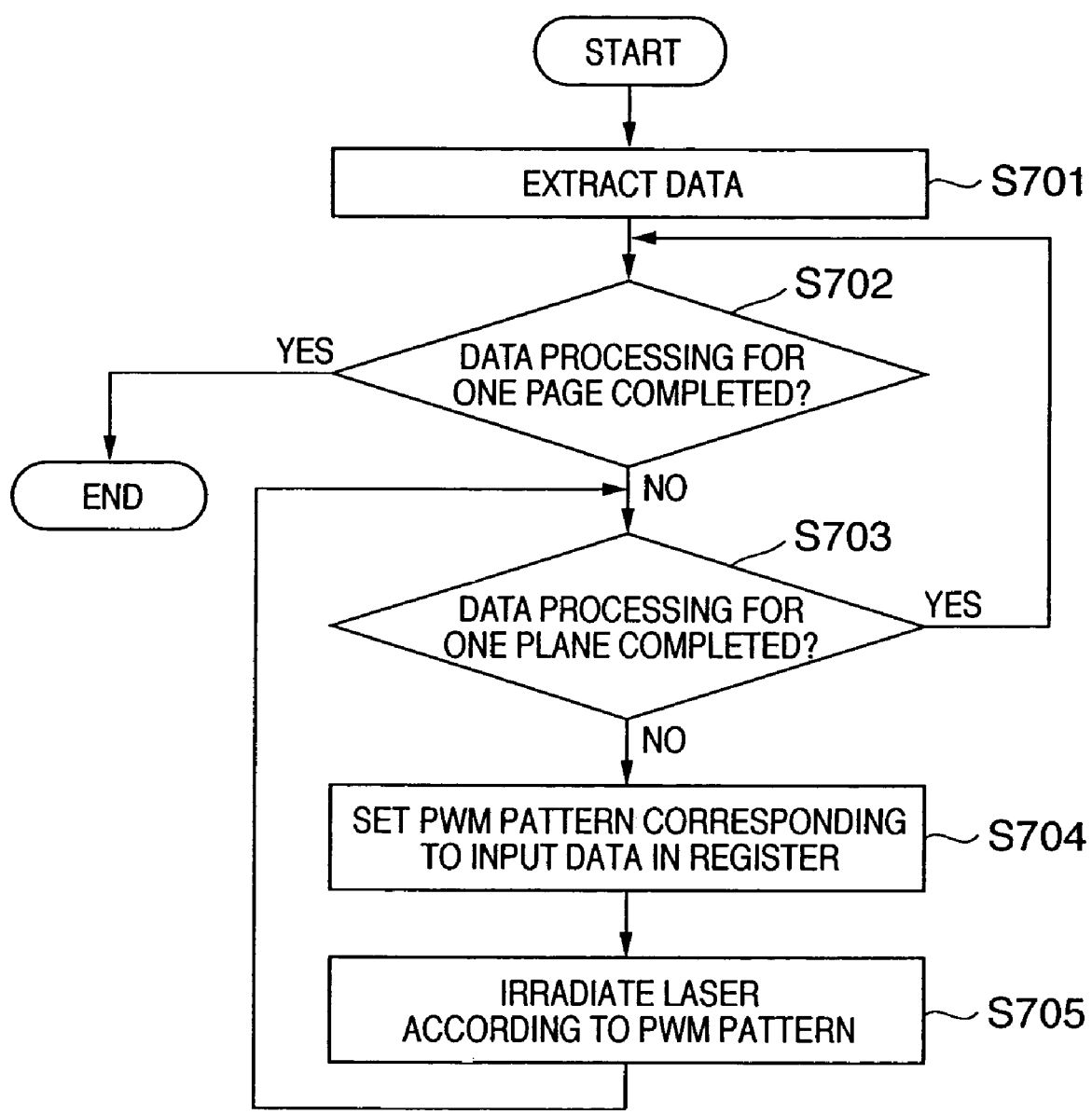
FIG. 7 is a flowchart showing a laser beam emission amount control operation executed by a PWM processing unit according to the embodiment of the present invention.

Referring to FIG. 7, stored bitmap data is extracted from the band buffer 155 (step S701), and it is determined whether or not all data for one page has been processed (step S702). If NO in step S702, it is determined whether or not data for one plane of the C, M, Y and K planes has been processed (step S703). If NO in step S703, a PWM growth pattern corresponding to input data is set in the register (step S704). The laser irradiation is then performed in accordance with the set PWM growth pattern (step S705), and the control returns to step S703. If it is determined in step S703 that data for one plane has been processed, the control returns to step S702. When it is determined in step S702 that all data for one page has been processed, the control ends.

According to the above-described embodiment, particularly in a case of printing data such as CAD data that places a great value on thin line reproducibility, the PWM growth pattern assignment in the respective CMYK colors is controlled in accordance with the printing mode and color mode to achieve appropriate toner adhesion amount. Therefore, it is possible to realize printing with the most appropriate density without deteriorating thin line reproducing ability.

Note, although the above-described embodiment determines whether or not the printing mode is a CAD data printing mode, the mode for CAD data is merely taken on as a typical example of a mode that places a great value on thin line reproducing ability. Therefore, a printing mode may be of a mode for an application program different from CAD data printing mode, which places a great value on thin line reproducing ability.

Furthermore, although the above-described embodiment determines whether or not the color mode is set in a monochrome mode, monochrome data is merely taken on as a typical example of single-color (mono-color) data. Therefore, it may be determined whether or not the color mode is set in a single-color mode other than a monochrome color.

Furthermore, although the above-described embodiment makes a determination of color mode or monochrome mode based on the setting of the print-setting screen shown in FIG. 6, the determination of monochrome mode may be made based on a result of determining whether or not printing data is color data or monochrome data.

Furthermore, although the above-described embodiment assumes that input data is RGB data and output data is CMYK data, the present invention is applicable to any color space representation, such as L*a*b*, XYZ and the like.

Moreover, although the above-described embodiment describes the PWM growth pattern table having five tones, the number of tones is arbitrary.

Moreover, although the above-described embodiment realizes PWM processing by digital control using a pattern table, the present invention is applicable to PWM processing using other control methods.

The present invention is not limited to the above embodiment and various changes and modifications can be made within the spirit and scope of the present invention. Therefore, to apprise the public of the scope of the present invention, the following claims are made.

What is claimed is:

1. A color printing apparatus having a pulse-width modulation means which performs pulse-width modulation for tone control, comprising:
    first determination means for determining whether a printing mode of printing data supplied is a CAD mode that places great value on thin line reproducibility;
    second determination means for determining whether the printing data is to be processed as single-color data; and
    setting means for setting a pulse width modulation pattern to be used by the pulse-width modulation means in accordance with determination results produced respectively by said first and said second determination means,
    wherein said setting means set a first pulse-width modulation pattern when said first determination means determine that the printing mode of the printing data is not the CAD mode or said second determination means determine that the printing data is to be processed as single-color data, and
    wherein said setting means set a second pulse-width modulation pattern, which has a smaller developer adhesion amount than the first pulse-width modulation pattern, when said first determination means determine that the printing mode is the CAD mode and in addition said second determination means determine that the printing data is not to be processed as single-color data.

2. A control method of a color printing apparatus having a pulse-width modulation means which performs pulse-width modulation for tone control, comprising:
    a first determination step of determining whether a printing mode of printing data supplied is a CAD mode that places great value on thin line reproducibility;
    a second determination step of determining whether the printing data is to be processed as single-color data; and
    a setting step of setting a pulse width modulation pattern to be used by the pulse-width modulation means in accordance with determination results obtained in said first and second determination steps,
    wherein said setting step includes setting a first pulse-width modulation pattern, when the result obtained in said first determination step is that the printing mode of the printing data is not the CAD mode or the result obtained in said second determination step is that the printing data is to be processed as single-color data, and includes setting a second pulse-width modulation pattern, which has a smaller developer adhesion amount than the first pulse-width modulation pattern, when the result obtained in said first determination step is that the printing mode is the CAD mode and in addition the result obtained in said second determination step is that the printing data is not to be processed as single-color data.

* * * * *

UNITED STATES PATENT AND TRADEMARK OFFICE
CERTIFICATE OF CORRECTION

PATENT NO. : 7,436,416 B2
APPLICATION NO. : 10/773422
DATED : October 14, 2008
INVENTOR(S) : Mizuki Muramatsu It is certified that error appears in the above-identified patent and that said Letters Patent is hereby corrected as shown below:

COVER PAGE, item 54 and Col. 1, line 5:
Title, "COLOR PRINTER AND CONTROL METHOD THEREOF WITH PULSE WIDTH MODULATION FOR TONE CONTROL BASED ON TYPE OF DOCUMENT AND NUMBER OF COLORS PRINTED" should read --COLOR PRINTER AND CONTROL METHOD THEREOF WITH PULSE-WIDTH MODULATION FOR TONE CONTROL BASED ON TYPE OF DOCUMENT AND NUMBER OF COLORS TO BE PRINTED--.

Signed and Sealed this

Eighth Day of December, 2009

David J. Kappos
*Director of the United States Patent and Trademark Office*